United States Patent
Takayama (10) Patent No.: US 10,646,918 B2
(45) Date of Patent: May 12, 2020

(54) RELAY DEVICE AND PRESSURE DETECTION DEVICE

(71) Applicant: MINEBEA MITSUMI Inc., Nagano (JP)

(72) Inventor: Yoshimasa Takayama, Fujisawa (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 16/467,203

(22) PCT Filed: Oct. 10, 2017

(86) PCT No.: PCT/JP2017/036590
§ 371 (c)(1),
(2) Date: Jun. 6, 2019

(87) PCT Pub. No.: WO2018/105227
PCT Pub. Date: Jun. 14, 2018

(65) Prior Publication Data
US 2019/0314890 A1    Oct. 17, 2019

(30) Foreign Application Priority Data
Dec. 8, 2016   (JP) .................. 2016-238554

(51) Int. Cl.
*G01L 27/00* (2006.01)
*B22D 17/32* (2006.01)
(Continued)

(52) U.S. Cl.
CPC ............. *B22D 17/32* (2013.01); *B22D 18/02* (2013.01); *B29C 45/26* (2013.01); *B29C 45/77* (2013.01); *G01L 27/005* (2013.01)

(58) Field of Classification Search
CPC ... G01L 19/147; G01L 9/0042; G01L 9/0054; G01L 9/0072; G01L 13/025; G01L 19/04;
(Continued)

(56) References Cited

U.S. PATENT DOCUMENTS

| 3,807,914 A | 4/1974 | Paulson et al. |
| 2006/0151795 A1* | 7/2006 | Yamaguchi ............ H03K 17/08 257/81 |

(Continued)

FOREIGN PATENT DOCUMENTS

| CN | 103481478 A | 1/2014 |
| CN | 205395008 U | 7/2016 |

(Continued)

OTHER PUBLICATIONS

Chinese Office Action dated Oct. 11, 2019 for corresponding Chinese Application No. 201780076143.2 and English translation.

(Continued)

*Primary Examiner* — Andre J Allen
(74) *Attorney, Agent, or Firm* — Pearne & Gordon LLP (57) ABSTRACT

A relay device and a pressure detection device are provided that are configured to eliminate the necessity of calibrating an output value from a pressure sensor in the pressure detection device even when a mold is replaced. A relay device for a pressure detection device provided with a pressure sensor (S1 to Sn) configured to detect an inner pressure in a cavity (CT) of a mold of an injection molding machine is provided. The relay device is integrally fixed to the mold. The relay device includes a storage configured to store specific information of the pressure sensor (S1 to Sn) provided to the mold to detect the inner pressure of the cavity (CT), the cavity (CT) being defined between a fixed-side mold and a movable-side mold of the mold.

4 Claims, 5 Drawing Sheets

(51) Int. Cl.
  *B22D 18/02* (2006.01)
  *B29C 45/26* (2006.01)
  *B29C 45/77* (2006.01)
(58) Field of Classification Search
  CPC . G01L 19/0038; G01L 19/0084; G01L 19/14; G01L 9/0075; G01L 19/0069; G01L 19/0618; G01L 9/0055; G01L 9/0073; G01L 19/0092; G01L 19/0645; G01L 19/143; G01L 9/0051; G01L 9/0052; G01L 19/0007; G01L 19/0046; G01L 19/06; G01L 19/0627; G01L 19/0681; G01L 27/002; G01L 9/00; G01L 9/0041; G01L 9/0044; G01L 11/025; G01L 11/04; G01L 19/0023; G01L 19/0672; G01L 19/069; G01L 19/142; G01L 19/16; G01L 7/00; G01L 7/163; G01L 7/166; G01L 9/0047; G01L 9/12; G01L 11/02; G01L 13/00; G01L 15/00; G01L 19/003; G01L 19/0609; G01L 19/083; G01L 19/10; G01L 19/145; G01L 19/148; G01L 27/005; G01L 7/08; G01L 7/082; G01L 9/0045; G01L 9/0048; G01L 9/006; G01L 9/007; G01L 9/0076; G01L 9/04; G01L 9/045; G01L 9/06; G01L 9/065; G01L 9/125; G01L 11/00; G01L 17/00; G01L 19/00; G01L 19/0015; G01L 19/0076; G01L 19/02; G01L 19/08; G01L 19/141; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/14; G01L 9/16; H01L 2224/48091; H01L 2924/00014; H01L 2224/48145; H01L 2224/73265; H01L 2924/00012; H01L 2224/04105; H01L 2224/24137; H01L 2224/48137; H01L 2224/49175; H01L 24/19; H01L 2924/1461; H01L 2924/1815; H01L 2924/18162; H01L 29/84; H01L 41/047; H01L 41/0475; H01L 41/1132

USPC .................................................. 73/700–756
See application file for complete search history.

(56) References Cited

U.S. PATENT DOCUMENTS

| | | | |
|---|---|---|---|
| 2009/0029570 A1* | 1/2009 | Ikeuchi | H01P 1/047 439/67 |
| 2012/0200377 A1* | 8/2012 | Lee | H01H 49/00 335/179 |
| 2018/0073949 A1* | 3/2018 | Tanaka | G01L 19/14 |

FOREIGN PATENT DOCUMENTS

| | | | |
|---|---|---|---|
| JP | 61-114140 | A | 5/1986 |
| JP | 06-015701 | A | 1/1994 |
| JP | 09-159559 | A | 6/1997 |
| JP | 11-083657 | A | 3/1999 |
| JP | 2929349 | B2 | 8/1999 |
| JP | 2008-055714 | A | 3/2008 |
| JP | 2014-122858 | A | 7/2014 |
| JP | 6389502 | B2 | 9/2018 |

OTHER PUBLICATIONS

International Preliminary Report on Patentability dated Jun. 11, 2019 for corresponding International Application No. PCT/JP2017/036590.

English translation of Written Opinion dated Dec. 26, 2017 for corresponding International Application No. PCT/JP2017/036590.

Decision to Grant a Patent dated Aug. 3, 2018 for corresponding Japanese Application No. 2016-238554 and English translation.

International Search Report for corresponding International Application No. PCT/JP2017/036590 dated Dec. 26, 2017.

Written Opinon for corresponding International Application No. PCT/JP2017/036590 dated Dec. 26, 2017.

Extended European Search Report dated Jan. 2, 2020 for corresponding European Application No. 17878370.0.

Korean Office Action dated Jan. 21, 2020 for corresponding Korean Application No. 10-2019-7017576 and English translation.

Miles Budimir; "Plug-and-Play Sensors", Machine Design, May 22, 2003, (Last retrieved Jan. 16, 2020) from https://www.machinedesign.com/archive/article/21817171/plugandplay-sensors.

"Trends in Measuring Technology, How to utilize an in-mold pressure sensor in the injection molding process monitoring system" posted in Apr. 2016. Note: Tables and drawings not in English translation, but referenced via number annotations, i.e., #1 #2 #3 etc.

Chinese Office Action dated Feb. 13, 2020 for corresponding Chinese Application No. 201780076143.2 and English translation.

* cited by examiner

RELAY DEVICE AND PRESSURE DETECTION DEVICE

TECHNICAL FIELD

The present invention relates to a relay device for a pressure detection device including a pressure sensor configured to detect an inner pressure of a cavity in a mold of an injection molding machine.

BACKGROUND ART

A typical pressure detection device in an injection molding machine includes a fixed mold supported by a fixed platen of a mold clamping device, a movable mold supported by a movable platen of the mold clamping device, and a pressure sensor configured to detect an inner pressure of a cavity defined by the fixed mold and the movable mold, the pressure sensor being attached to a rear end surface of an ejector pin of a movable mold (for example, see Patent Literature 1).

Such a pressure detection device in the injection molding machine is configured to store, as a correction value, a pressure detection value based on an output from the pressure sensor during a predetermined period from completion of ejection using an ejector pin to a mold-opened state where an inner pressure in the mold reaches zero in principle, and correct an output from the pressure sensor at the time of pressure detection with the correction value.

DOCUMENT LIST

Patent Literature

Patent Literature 1: Japanese Patent No. 2929349

SUMMARY OF INVENTION

Technical Problem

However, the injection molding machine described in Patent Literature 1 includes a plurality of pressure sensors corresponding one-to-one to a plurality of cavities defined in the mold and the plurality of pressure sensors have different individual rated outputs.

Thus, when the mold is replaced, the pressure detection device in the injection molding machine of Patent Literature 1 inevitably troubles an operator to calibrate output values from a plurality of pressure sensors provided to the replacing mold in accordance with differences between the rated outputs of these pressure sensors.

Accordingly, an object of the present invention, which is intended to overcome the above problem, is to provide a relay device and a pressure detection device that allow for accurately calibrating, even when a mold is replaced, output values from pressure sensors provided to the replacing mold in the pressure detection device without troubling an operator.

Solution to Problem

To achieve the above object, according to the present invention, a relay device (70) for a pressure detection device (100) provided with a pressure sensor (S1 to Sn) configured to detect an inner pressure in a cavity (CT) of a mold (51) of an injection molding machine (1) is characterized in that the relay device (70) is integrally fixed to the mold (51), and the relay device (70) includes a storage (71) configured to store specific information of the pressure sensor (S1 to Sn) provided to the mold (51) to detect the inner pressure in the cavity (CT), the cavity (CT) being defined between a fixed-side mold (53) and a movable-side mold (58) of the mold (51).

In the present invention, the relay device (70) is characterized in that when the relay device (70) is connected to a signal amplifier (90) of the pressure detection device (100), the signal amplifier (90) automatically reads the specific information of the pressure sensor (S1 to Sn).

In the present invention, the specific information is characterized in that the specific information is calibration information of the pressure sensor held by the pressure sensor (S1 to Sn).

In the present invention, the specific information is characterized in that the specific information is a rated load of the pressure sensor (S1 to Sn) and a pin-sectional area of an ejector pin (59) to which the pressure sensor (S1 to Sn) is attached.

According to the present invention, a pressure detection device (100) provided with a pressure sensor (S1 to Sn) configured to detect an inner pressure of a cavity (CT) in a mold (51) of an injection molding machine (1) is characterized in that the pressure detection device (100) includes a relay device (70) integrally fixed to the mold (51) and configured to relay a sensor output from the pressure sensor (S1 to Sn) to an external device (99), and the relay device (70) includes a storage (71) configured to store specific information of the pressure sensor (S1 to Sn) provided to the mold (51) to detect the inner pressure of the cavity (CT), the cavity (CT) being defined between a fixed-side mold (53) and a movable-side mold (58) of the mold (51).

Effects of Invention

According to the present invention, even when a mold is replaced, an output value from a pressure sensor provided to the mold is accurately calibrated in a pressure detection device without troubling an operator.

DESCRIPTION OF EMBODIMENTS

Embodiment of the Present Invention

Figure 1:
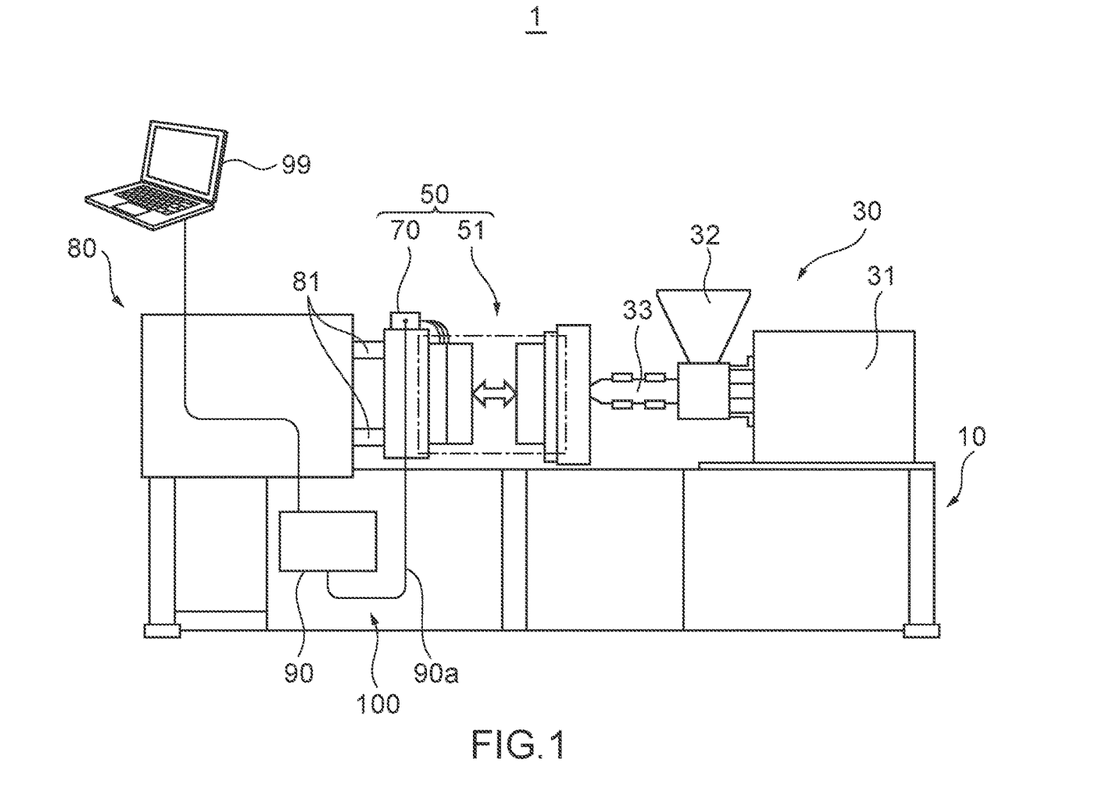
FIG. 1 A side view of an overall configuration of an injection molding machine of an embodiment of the present invention.
Figure 2:
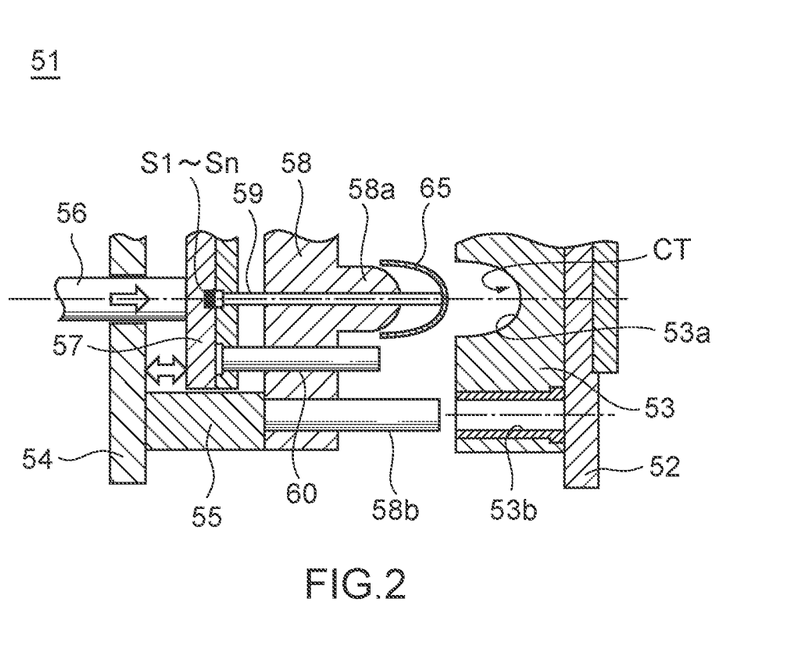
FIG. 2 A sectional view of a configuration of a mold used in the injection molding machine of the embodiment of the present invention.
Figure 3:
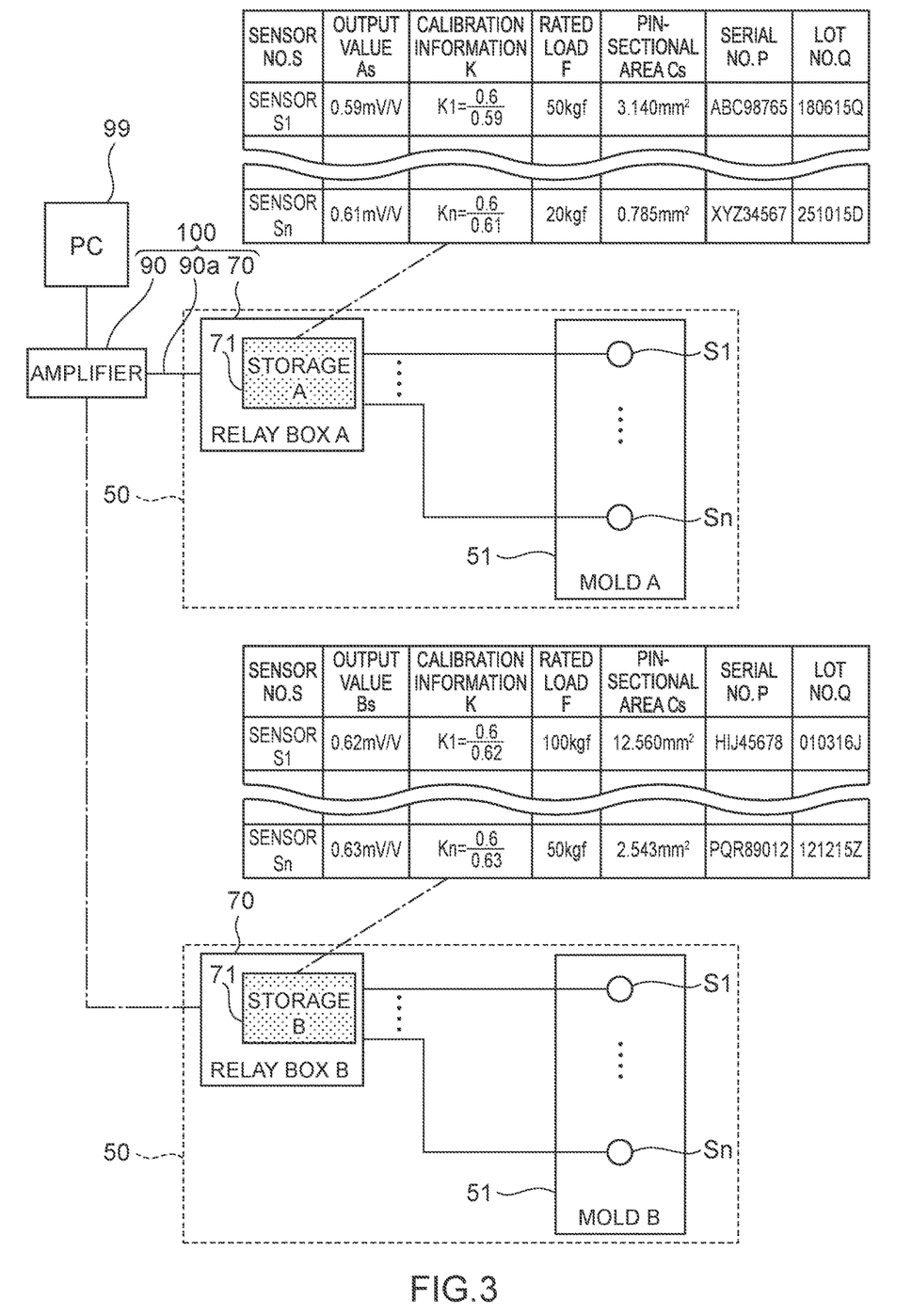
FIG. 3 A block diagram of a configuration of an inner pressure detection device used in the injection molding machine of the embodiment of the present invention.
Figure 4:
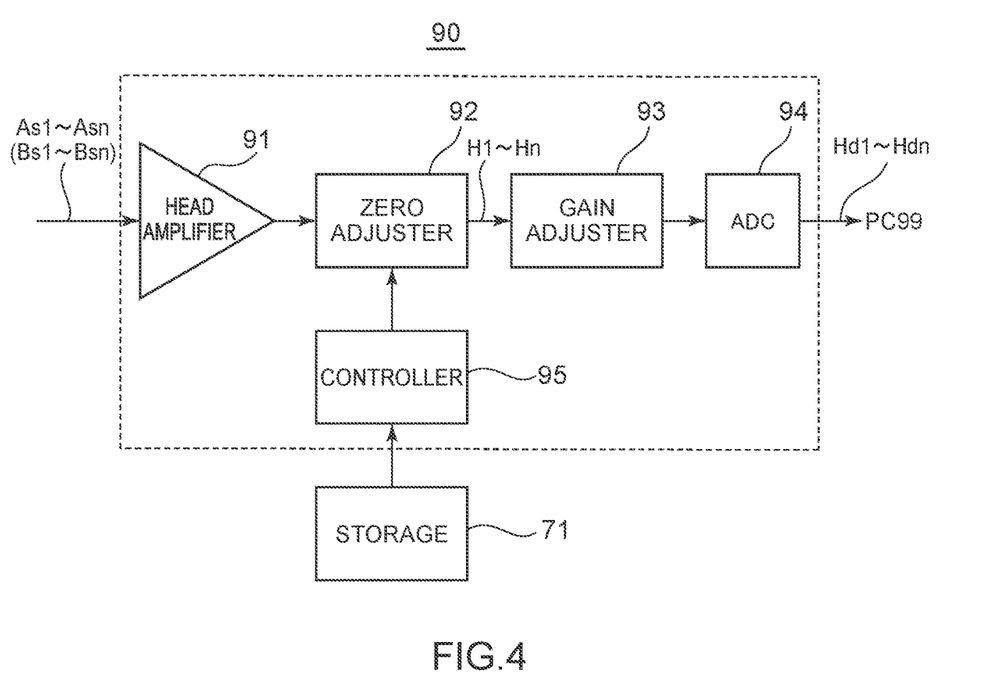
FIG. 4 A block diagram of a configuration of an amplifier of the inner pressure detection device of the embodiment of the present invention.
Figure 5:
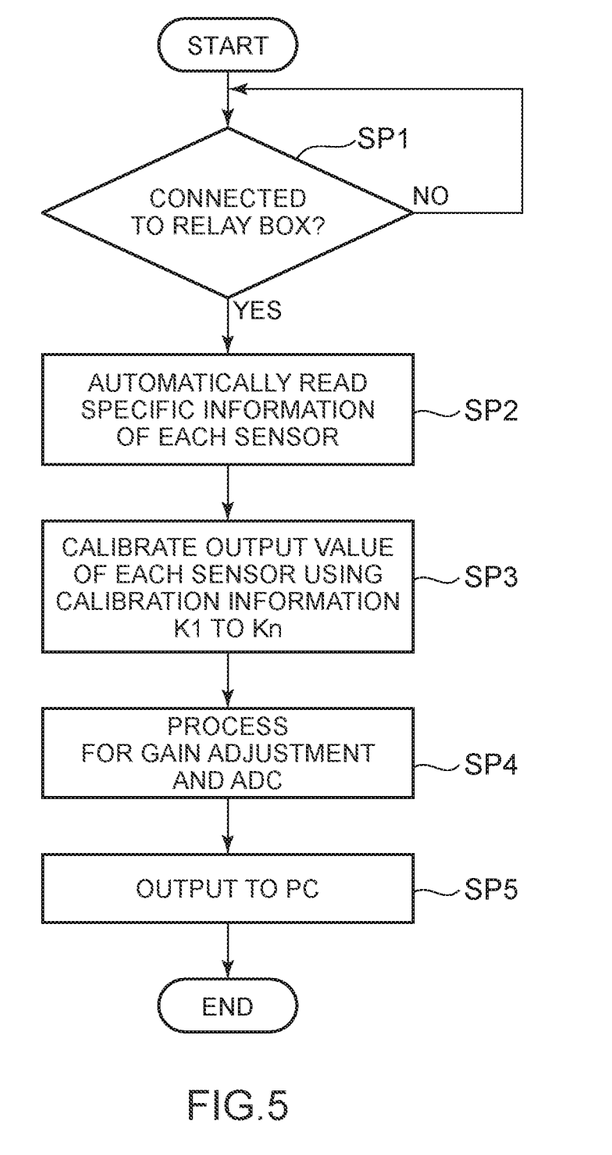
FIG. 5 A flow chart of a calibration process for a pressure sensor being performed by the amplifier of the inner pressure detection device of the embodiment of the present invention.

Hereinafter, an embodiment of the present invention will be described with reference to the drawings. FIG. 1 is a side view of an overall configuration of an injection molding machine of the embodiment of the present invention. FIG. 2 is a sectional view of a configuration of a mold used in the injection molding machine of the embodiment of the present invention. FIG. 3 is a block diagram of a configuration of a pressure detection device used in the injection molding machine of the embodiment of the present invention. FIG. 4 is a block diagram of a configuration of an amplifier of the pressure detection device of the embodiment of the present invention. FIG. 5 is a flow chart of a calibration process for a pressure sensor being performed by the amplifier of the pressure detection device of the embodiment of the present invention.

Configuration of Injection Molding Machine

As shown in FIG. 1, an injection molding machine 1 includes a bed 10, an injection unit 30, a mold unit 50, and a mold clamping unit 80, the injection unit 30, mold unit 50, and mold clamping unit 80 being mounted and supported on the bed 10.

The injection unit 30 includes a driver 31 using a hydraulic motor, a hopper 32, and a cylinder 33. The injection unit 30 is a mechanical part configured to heat a material fed through the hopper 32 by the cylinder 33 and inject the material having been heated (hereinafter also referred to as "heated material") to a cavity CT (FIG. 2) of a mold 51 of the mold unit 50 through a nozzle (not shown) at a distal end of the cylinder 33 to fill the cavity CT by driving the cylinder 33 by the driver 31.

The mold unit 50, which is a mechanical part configured to eject the heated material injected from the cylinder 33 of the injection unit 30 after the heated material is molded in the cavity CT of the mold 51, includes the mold 51 and a relay box 70 (relay device). It should be noted that configurations of the mold 51 and the relay box 70 will be described later.

The mold clamping unit 80 is a, for example, toggle or direct-pressure mechanical part configured to open and close the mold 51 of the mold unit 50 and to apply a pressure for keeping the mold 51 closed against a pressure of the heated material filling the cavity CT.

As shown in FIG. 2, the mold 51 includes a fixed-side mold 53 attached to a fixed-side attachment plate 52 and a movable-side mold 58 attached to a movable-side attachment plate 54 via a spacer block 55.

The fixed-side mold 53 is provided with a curved recessed part 53a for defining the cavity CT between the movable-side mold 58 and the fixed-side mold 53, and a guide hole 53b. The movable-side mold 58 is provided with a protruding part 58a for defining the cavity CT between the fixed-side mold 53 and the movable-side mold 58, and a guide pin 58b at a position facing the guide hole 53b of the fixed-side mold 53.

Additionally, an ejector pin 59 is longitudinally movably supported at a position corresponding to a central portion of the movable-side mold 58 and a center of the cavity CT, penetrating through a center of the protruding part 58a. A distal end portion of the ejector pin 59 is a portion that is to abut on a product 65 molded in accordance with a shape of the cavity CT for ejection of the product 65.

Meanwhile, a rear end portion of the ejector pin 59 is integrally attached to an ejector plate 57 and a force sensor S1 (pressure sensor) is integrally attached to an end surface of the rear end portion.

It should be noted that the mold 51 has a plurality of cavities CT defined between the fixed-side mold 53 and the movable-side mold 58 and force sensors S2 to Sn are integrally fixed to end surfaces of rear end portions of the ejector pins 59 corresponding one-to-one to the cavities CT. In other words, the force sensors S1 to Sn are provided in one-to-one correspondence with the plurality of cavities CT.

In this regard, for example, strain gauges are used as the force sensors S1 to Sn and inner pressures of the cavities CT are applied to the respective force sensors S1 to Sn through the ejector pins 59. The force sensors S1 to Sn can thus detect the inner pressures of the respective cavities CT (in this case, fill pressures of the heated material fed by the injection unit 30 to fill the respective cavities CT).

The ejector plate 57 is attached with an ejector rod 56 at a side facing the movable-side attachment plate 54 and attached with a return pin 60 at a side facing the movable-side mold 58. The ejector rod 56 is attached to the ejector plate 57, while penetrating through the movable-side attachment plate 54. The return pin 60 is attached with a spring (not shown) for returning the ejector plate 57 to an original position.

The mold clamping unit 80 (FIG. 1) includes an enclosure, a hydraulic cylinder in the enclosure, and four tie bars 81 connecting four corners of the enclosure to four corners of each of the fixed-side attachment plate 52 and the movable-side attachment plate 54, respectively. The ejector rod 56 of the mold 51 is connected to the hydraulic cylinder of the mold clamping unit 80.

Furthermore, in the injection molding machine 1 with the above configuration, the relay box 70 is removably integrally fixed to the mold 51 of the mold unit 50. Specifically, the relay box 70 is fixed at any place where it does not interfere with a motion of the mold 51.

The relay box 70 is integrally fixed while being housed in a pocket-shaped recessed part formed on a metal surface of the mold 51. However, the relay box 70 is not necessarily fixed as described above. Alternatively, the relay box 70 may be firmly integrally fixed to the metal surface of the mold 51 using a magnet or may be integrally fixed in any other manner.

A dedicated amplifier 90 is connected to the relay box 70 through a single connection cord 90a and a personal computer 99 is connected to the amplifier 90. It should be noted that the amplifier 90 and the relay box 70 and the amplifier 90 and the personal computer 99 are not necessarily connected by wire but may be wirelessly connected by a method such as near field communication.

In the injection molding machine 1, the relay box 70, which is integrally fixed to the mold 51, the amplifier 90 (signal amplifier), and the connection cord 90a provide an inner pressure detection device 100 (pressure detection device). It should be noted that the amplifier 90 is disposed inside the bed 10 in consideration of connectivity of the relay box 70 through the connection cord 90a.

As shown in FIG. 3, the relay box 70 (relay box A) in the inner pressure detection device 100 is a functional part configured to relay sensor outputs from the plurality of force sensors S1 to Sn, which are integrally provided to the mold 51 (mold A), to the amplifier 90. In addition, the relay box 70, which include a box-shaped member, includes a storage 71 (storage A) such as a rewritable non-volatile memory (EEPROM) disposed inside the box-shaped member, while having the above relay function.

The storage 71 (storage A) stores individual specific information of each sensor including a difference of an actual output value of each of the plurality of force sensors S1 to Sn, which are disposed in one-to-one correspondence with the plurality of ejector pins 59 of the mold 51, from a rated output thereof.

Even when there is no difference between the rated value and the actual output value of each of the force sensors S1 to Sn, the storage 71 (storage A) still stores the actual output value. It should be noted that the specific information of each of the force sensors S1 to Sn to be stored in the storage 71 (storage A) needs to be initially inputted by an operator through the personal computer 99 to be stored in the storage 71 (storage A).

Furthermore, the relay box 70, which has a size, for example, suitable to be attached to or embedded in the mold 51, includes the storage 71 in the form of a non-volatile memory with a high capacity, thus being capable of storing all the individual specific information of the plurality of force sensors S1 to Sn.

The specific information stored in the storage 71 (storage A) includes sensor number, output value, calibration information, rated load, pin-sectional area of the ejector pin 59, serial number, and lot number, for example.

Specifically, when the rated output (i.e., an output voltage per 1V applied voltage resulting from application of a maximum rated load) of the force sensor S1 is 0.6 [mV/V], an actual output value As1 of the force sensor S1 in the mold 51 (mold A) is 0.59 [mV/V], . . . an actual output value Asn of the sensor Sn is 0.61 [mV/V].

In this case, the actual output value As1 of the force sensor S1 in the mold A is deviated from the rated output and thus needs to be calibrated. Accordingly, calibration information K1 (K1=0.6/0.59) is stored in the storage 71 along with the actual output value As1 (0.59 [mV/V]) of the force sensor S1 in association with a sensor number S (force sensor S1).

Likewise, for the force sensor Sn in the mold A, calibration information Kn (Kn=0.6/0.61) is stored in the storage 71 along with the actual output value Asn (0.61 [mV/V]) of the force sensor Sn in association with the sensor number S (force sensor S1).

A rated load F1 (F1=50 kgf) of the force sensor S1 in the mold A and a pin-sectional area CS1 (CS1=3.140 mm$^2$) of the end surface of the rear end portion of the ejector pin 59 with the force sensor S1 fixed thereto are stored in the storage 71 in association with the sensor number S (force sensor S1). Likewise, the rated load Fn (Fn=20 kgf) and pin-sectional area CSn (CSn=0.785 mm$^2$) of the force sensor Sn in the mold A are stored in the storage 71 in association with the sensor number S (force sensor Sn).

In addition to the above, serial number P1 (e.g., [ABC98765]) and lot number Q1 (e.g., [180615Q]) of the force sensor S1 in the mold A are also stored in the storage 71 in association with the sensor number S (force sensor S1). Likewise, serial number Pn (e.g., [XYZ34567]) and lot number Qn (e.g., [251015D]) of the force sensor Sn in the mold A are also stored in the storage 71 in association with the sensor number S (force sensor Sn).

The above information of the force sensor S1 in the mold A, such as the output value As1 (0.59 [mV/V]), the calibration information K1 (K1=0.6/0.59), the rated load F1 (F1=50 kgf), the pin-sectional area CS1 (CS1=3.140 mm$^2$), the serial number P1 (e.g., [ABC98765]), and the lot number Q1 (e.g., [180615Q]), is stored as the specific information of the force sensor S1 in the storage 71 (storage A). The like specific information of the force sensor Sn in the mold A is also stored in the storage 71 (storage A). In other words, the specific information of each of the force sensors S1 to Sn in the mold A is stored in the storage 71 (storage A).

Meanwhile, the force sensor S1 in another mold 51 (mold B) prepared as a replacing mold for the injection molding machine 1 has an actual output value Bs1 of 0.62 [mV/V] and the force sensor Sn has an actual output value Bsn of 0.63 [mV/V].

In this case, the calibration information K1 (K1=0.6/0.62) is stored in the storage 71 along with the actual output value Bs1 (0.62 [mV/V]) of the force sensor S1 in association with the sensor number S (force sensor S1). Likewise, for the force sensor Sn in the mold B, the calibration information Kn (Kn=0.6/0.63) is also stored in the storage 71 along with the output value Bsn (0.63 [mV/V]) of the force sensor Sn in association with the sensor number S (force sensor Sn).

In addition, the rated load F1 (F1=100 kgf) and pin-sectional area CS1 (CS1=12.560 mm$^2$) of the force sensor S1 in the mold B are stored in the storage 71 in association with the sensor number S (force sensor S1). Likewise, the rated load Fn (Fn=50 kgf) and pin-sectional area CSn (CSn=2.543 mm$^2$) of the force sensor Sn in the mold B are stored in the storage 71 in association with the sensor number S (force sensor Sn).

In addition to the above, the serial number P1 (e.g., [ABC98765]) and lot number Q1 (e.g., [180615Q]) of the force sensor S1 in the mold B are also stored in the storage 71 in association with the sensor number S (force sensor S1). Likewise, the serial number Pn (e.g., [XYZ34567]) and lot number Qn (e.g., [251015D]) of the force sensor Sn in the mold B are also stored in the storage 71 in association with the sensor number S (force sensor Sn).

The above information of the force sensor S1 in the mold B, such as the output value Bs1 (0.59 [mV/V]), the calibration information K1 (K1=0.6/0.59), the rated load F1, the pin-sectional area CS1, the serial number P1 (e.g., [ABC98765]), and the lot number Q1 (e.g., [180615Q]), is stored as the specific information of the force sensor S1 in the storage 71. The like specific information of the force sensor Sn in the mold B is also stored in the storage 71. In other words, the specific information of each of the force sensors S1 to Sn in the mold B is stored in the storage 71 (storage B).

Thus, when the relay box 70 (relay box A) of the inner pressure detection device 100 is connected to the amplifier 90 through the connection cord 90a, the specific information of each of the force sensors S1 to Sn stored in the storage 71 (storage A) is readable by the amplifier 90.

As shown in FIG. 4, the amplifier 90 includes a head amplifier 91, a zero adjuster 92, a gain adjuster 93, an analog/digital converter (ADC) 94, and a controller 95. The controller 95 is configured to collectively control the head amplifier 91, the zero adjuster 92, the gain adjuster 93, and the analog/digital converter 94. When connected to the relay box 70, the controller 95 can read the specific information from the storage 71 of the relay box 70.

The head amplifier 91 is a functional part configured to amplify the actual output values of the force sensors S1 to Sn supplied from the relay box 70. The zero adjuster 92 is a functional part configured to adjust the actual output values of the force sensors S1 to Sn using the calibration information K1 to Kn to accurate output values with respect to zero point, respectively. The gain adjuster 93 is a functional part configured to amplify the output values of the force sensors S1 to Sn. The analog/digital converter 94 is a functional part configured to convert the output value (analog signals) of the force sensors S1 to Sn to digital pressure detection data and output the digital pressure detection data to the personal computer 99. The controller 95, which include a microcomputer including a CPU and a memory, is a functional part configured to collectively control each the components of the amplifier 90.

It should be noted that the controller 95 of the amplifier 90 has a plug-and-play function and thus automatically reads, when recognizing connection to the relay box 70

(relay box A) through the connection cord 90a, the specific information (sensor number Sn, output value As, calibration information K, rated load F, pin-sectional area CS of the ejector pin, serial number P, and lot number Q) of each of the force sensors S1 to Sn from the storage 71 of the relay box 70.

Operations and Effects

Operations and effects of the inner pressure detection device 100 of the injection molding machine 1 with the above configuration will be described. As shown in FIG. 5, the controller 95 of the amplifier 90 of the inner pressure detection device 100 determines whether the amplifier 90 is electrically connected to the relay box 70, which is integrally fixed to the mold 51 through the connection cord 90a (Step SP1). When the result of determination is negative in Step SP1 (Step SP1: NO), the controller 95 recognizes that the inner pressures of the cavities CT of the mold 51 are undetectable and waits for the result of determination to become positive.

Meanwhile, when the result of determination is positive in Step SP1 (Step SP1: YES), the controller 95 recognizes that the amplifier 90 is electrically connected to the relay box 70 with the inner pressures of the cavities CT of the mold 51 being detectable.

When the cavities CT of the mold 51 are filled with the heated material fed by the cylinder 33 of the injection unit 30, the inner pressures of the cavities CT are applied to the respective force sensors S1 to Sn attached to the rear end surfaces of the ejector pins 59. The actual output values As1 to Asn from the respective force sensors S1 to Sn are thus obtained as detection results and the plurality of actual output values As1 to Asn are sent to the relay box 70 (relay box A).

While sending the output values As1 to Asn, which is relayed from the relay box 70, to the zero adjuster 92 via the head amplifier 91, the controller 95 of the amplifier 90 reads the specific information of each of the force sensors S1 to Sn from the storage 71 of the relay box 70 and outputs the specific information to the zero adjuster 92 (Step SP2).

The controller 95 of the amplifier 90 calibrates the actual output values As1 to Asn of the force sensors S1 to Sn using the calibration information K1 to Kn among the specific information of the force sensors S1 to Sn read from the storage 71 of the relay box 70 by the zero adjuster 92, thus generating calibrated accurate correction output values H1 to Hn (Step SP3).

The controller 95 of the amplifier 90 commands the gain adjuster 93 to amplify the accurate correction output values H1 to Hn calibrated by the zero adjuster 92 and, subsequently, commands the analog/digital converter 94 to convert the accurate correction output values H1 to Hn to digital correction output data Hd1 to Hdn (Step SP4).

The controller 95 of the amplifier 90 then outputs the correction output data Hd1 to Hdn to the personal computer 99 and displays accurate inner pressure values corresponding to the correction output data Hd1 to Hdn on a monitor of the personal computer 99 so that an operator can see the inner pressure values (Step SP5).

The above series of process is also performed when the mold A is replaced with the mold B. Specifically, the controller 95 of the amplifier 90 reads the specific information of each of the force sensors S1 to Sn in the mold B, which is stored in advance in the storage 71 of the relay box 70 (relay box B) integrally fixed to the mold B, so that the actual output values Bs1 to Bsn can be calibrated to output the accurate correction output data Hd1 to Hdn.

In other words, the inner pressure detection device 100 eliminates the necessity of storing in advance the specific information of each of the force sensors S1 to Sn in each of the plurality of molds 51 in the amplifier 90 and the personal computer 99 and allows the amplifier 90 to read the specific information of each of the force sensors S1 to Sn merely by connecting the amplifier 90 to the relay box 70 integrally fixed to the mold 51. The inner pressure detection device 100 can thus output accurate detection results without making an operator particularly aware of calibration even when there are differences between the actual output values of the force sensors S1 to Sn.

In addition, the controller 95 of the inner pressure detection device 100 can read the pin-sectional area CS of each of the ejector pins 59 from the storage 71 of the relay box 70, so that the actual pressure value of each of the force sensors S1 to Sn can be obtained based on a load value (the inner pressure of the corresponding cavity CT) detected by corresponding one of the force sensors S1 to Sn, which are indicated by the correction output data Hd1 to Hdn, and the pin-sectional area CS.

The controller 95 can thus determine whether the actual pressure value is an abnormal value exceeding a maximum load represented by the rated load F. When the actual pressure value is determined to be the abnormal value, the controller 95 can report the determination result to the personal computer 99 so that the determination result is displayed on the monitor, urging an operator to stop the operation of the injection molding machine 1.

Furthermore, in the inner pressure detection device 100, the controller 95 of the amplifier 90 can read the serial number P and the lot number Q of each of the force sensors S1 to Sn stored in advance in the storage 71 of the relay box 70 and output the serial number P and the lot number Q to the monitor of the personal computer 99.

An operator can thus see the serial number P of each of the force sensors S1 to Sn, thereby identifying the manufacturing date of each of the force sensors S1 to Sn provided to the mold 51 and, consequently, determining the necessity of replacement of each of the force sensors S1 to Sn. The operator can also see the lot number Q of each of the force sensors S1 to Sn, thereby determining the necessity and time of replacement of each of the force sensors S1 to Sn in view of the possibility of being defective and the risk level of malfunction based on the defective rate of sensors with the lot number Q.

It should be noted that the inner pressure detection device 100 is configured to require an operator to first input the specific information of each of the force sensors S1 to Sn through the personal computer 99 so that the specific information is stored in the storage 71. Such a configuration of the inner pressure detection device 100 allows for updating, when the force sensors S1 to Sn provided to the mold 51 are replaced with new ones, the specific information of the force sensors S1 to Sn by inputting the specific information of each of the replacing new force sensors S1 to Sn. Thus, the storage 71 can always store the latest specific information of each of the force sensors S1 to Sn in the mold 51 for the use in calibration and the like.

Other Embodiment(s)

In the above embodiment, it is described that the relay box 70 is removably integrally fixed to the mold 51 but the present invention is not limited thereto. Alternatively, the relay box 70 may be non-removably integrally fixed to the mold 51 with the storage 71 being removably integrally fixed to the relay box 70.

In the above embodiment, it is described that calibration is performed using the amplifier 90 and the calibrated correction output data Hd1 to Hd*n* is outputted to the personal computer 99 but the present invention is not limited thereto. Alternatively, the personal computer 99 may include the functional parts of the amplifier 90. In this case, the inner pressure detection device 100 includes the relay box 70 and the personal computer 99.

Although the preferred embodiment of the present invention is described above, the present invention is not limited to the inner pressure detection device 100 of the above embodiment but may be implemented in any embodiments within the concept of the present invention and scope of the claims. In addition, the components may be selectively combined as needed to achieve at least a part of the above object and effects. For example, the shape, material, location, size, and the like of each component of the above embodiment may be changed as needed in accordance with a specific implementation of the present invention.

LIST OF REFERENCE SIGNS

1 injection molding machine,
10 bed,
30 injection unit,
31 driver,
32 hopper,
33 cylinder,
50 mold unit,
51 mold,
52 fixed-side attachment plate,
53 fixed-side mold,
53*a* recessed part,
53*b* guide hole,
54 movable-side attachment plate,
55 spacer block,
56 ejector rod,
57 ejector plate,
58 movable-side mold,
58*a* protruding part,
58*b* guide pin,
59 ejector pin,
60 return pin,
65 product,
70 relay box (relay device),
71 storage,
80 mold clamping unit,
81 tie bar,
90 amplifier (signal amplifier),
90*a* connection cord,
91 head amplifier,
92 zero adjuster,
93 gain adjuster,
94 analog/digital converter,
95 controller,
99 personal computer,
100 inner pressure detecting device (pressure detecting device),
CT cavity,
S1 to S*n* force sensor (pressure sensor)

The invention claimed is:

1. A relay device for a pressure detection device provided with a pressure sensor configured to detect an inner pressure of a cavity in a mold of an injection molding machine, the relay device being characterized in that
   the relay device is integrally fixed to the mold, and
   the relay device comprises a storage configured to store specific information of the pressure sensor provided to the mold to detect the inner pressure of the cavity, the cavity being defined between a fixed-side mold and a movable-side mold of the mold, wherein
   the specific information is a rated load of the pressure sensor and a pin-sectional area of an ejector pin to which the pressure sensor is attached.

2. The relay device according to claim 1, wherein the relay device is connected to a signal amplifier of the pressure detection device, the signal amplifier automatically reads the specific information of the pressure sensor.

3. The relay device according to claim 1 wherein the specific information is calibration information of the pressure sensor held by the pressure sensor.

4. A pressure detection device provided with a pressure sensor configured to detect an inner pressure of a cavity in a mold of an injection molding machine, the pressure detection device being characterized in that
   the pressure detection device comprises a relay device integrally fixed to the mold and configured to relay a sensor output from the pressure sensor to an external device, and
   the relay device comprises a storage configured to store specific information of the pressure sensor provided to the mold to detect the inner pressure of the cavity, the cavity being defined between a fixed-side mold and a movable-side mold of the mold, wherein
   the specific information is a rated load of the pressure sensor and a pin-sectional area of an ejector pin to which the pressure sensor is attached.

* * * * *